United States Patent [19]

Morita

[11] Patent Number: 5,674,442
[45] Date of Patent: Oct. 7, 1997

[54] PROCESS FOR MANUFACTURING THERMOPLASTIC SHEET AND APPARATUS THEREFOR

[75] Inventor: Keita Morita, Tokyo, Japan

[73] Assignee: IPEC Co. Ltd., Tokyo, Japan

[21] Appl. No.: 505,276

[22] PCT Filed: Dec. 28, 1993

[86] PCT No.: PCT/JP93/01932

§ 371 Date: Jul. 28, 1995

§ 102(e) Date: Jul. 28, 1995

[87] PCT Pub. No.: WO95/18004

PCT Pub. Date: Jul. 6, 1995

[51] Int. Cl.$^6$ .................................................. B29C 47/88
[52] U.S. Cl. .................. 264/178 R; 264/210.2; 264/211.12; 264/237; 264/284; 264/348; 425/71; 425/327; 425/377; 425/378.1; 425/385
[58] Field of Search ............... 264/178 R, 348, 264/237, 210.1, 210.2, 210.5, 210.6, 210.7, 216, 284, 211.12; 425/327, 71, 377, 385, 378.1

[56] References Cited

U.S. PATENT DOCUMENTS

| 4,548,778 | 10/1985 | Fujii | 264/178 R |
|---|---|---|---|
| 4,627,804 | 12/1986 | Kobayashi et al. | |
| 5,026,778 | 6/1991 | Fujii et al. | 264/210.6 |
| 5,204,037 | 4/1993 | Fujii | 264/216 |
| 5,211,899 | 5/1993 | Fujii | 264/210.2 |

FOREIGN PATENT DOCUMENTS

| A 0 496 260 | 7/1992 | European Pat. Off. |
| A 2 163 759 | 7/1973 | France. |
| 59-59420 | 4/1984 | Japan. |
| 63-60726 | 3/1988 | Japan. |
| 1-26859 | 5/1989 | Japan. |
| 2-61371 | 12/1990 | Japan. |

*Primary Examiner*—Mathieu D. Vargot
*Attorney, Agent, or Firm*—Greer, Burns & Crain, Ltd.

[57] ABSTRACT

In an apparatus and process for manufacturing a thermoplastic sheet or film having superior optical characteristics such as improved transparency, gloss and surface smoothness, a thermoplastic sheet is extruded, passed between a cast drum and an endless metallic belt while being compressed and subjected to a primary cooling by the belt and drum. The sheet or film is secondarily cooled in a water bath, after which it is dewatered and subjected to a thermal treatment at a temperature in the range of 40° C. below, to 15° C. above the thermal deformation temperature of the resin sheet to produce the improved sheet of the invention. In addition to producing a film or sheet with improved characteristics, the apparatus of the invention allows production of sheets or films at a rate up to about 10 m/min.

15 Claims, 1 Drawing Sheet

PROCESS FOR MANUFACTURING THERMOPLASTIC SHEET AND APPARATUS THEREFOR

TECHNICAL FIELD

The present invention relates to a process for manufacturing a thermoplastic sheet or film and an apparatus therefore, which may be optimally used in various industrial applications to provide a package for foodstuffs, stationery document files etc., and various packaging cases.

BACKGROUND ART

The thermoplastic sheet, such as, for example, a crystalline thermoplastic sheet (or a film) is used extensively in various industrial applications, by virtue of its superior characteristics such as heat resistance, various physical properties, chemical resistance and hinging characteristics.

However, neither a process for making a crystalline thermoplastic sheet of improved transparency, gloss and surface flatness nor a technology for making such a sheet at a high-speed has been developed and available.

Known processes for manufacturing the crystalline thermoplastic sheet include the air-knife process, the polishing-roll process, the water-cooling process and the like.

In the air-knife process, it may be difficult to maintain a surface flatness since the film upon which an air is sprayed may be variable, which is caused by a step of tightly urging the film-like fused thermoplastic resin against the cast drum under an air pressure to be injected from the nozzle. Besides, one side of the sheet cannot be cooled rapidly because it is cooled by air. Consequently, the process has a drawback in that it may not produce a sheet of improved transparency, surface flatness and thickness precision etc. Urging forces by an air pressure has approximately a 3000 mm water column as its upper limit, and a production speed of approximately 20 m/minute is a maximum for producing a commercially valuable sheet or film, because the air is directed only at a single point. As a result, this air-knife process is mainly used to make a reduced thickness sheet of approximately 0.2–0.5 mm which would not need particular appearance characteristics. However, this process is not suitable to produce an increased thickness sheet of approximately 0.7 mm or more.

The polishing-roll process is a method for producing a sheet by forcing a film-wise fused thermoplastic resin between a pair of metallic rolls. In this process, the sheet thickness and the surface configuration are imposed simultaneously at a point where a pair of rolls contact each other, and if a drawing-speed is reduced to an order of approximately 4 m/min or less, a sheet of improved surface flatness may be produced. However, when the drawing speed is higher than approximately 6 m/min, a sheet-forming step may not follow such a fast rate, and still produce a commercially usable sheet.

If the reduced thickness sheet of approximately 0.4 mm or less is made in accordance with the polishing-roll process, water's edge-like waves are generated to prevent production of commercially usable sheets.

Many proposals have been made in the water-cooling process, and a typical example is found in Japanese Patent Application Unexamined Publication No. Hei.4-158022. In this sheet manufacturing process, a sheet-like fused crystalline thermoplastic resin is cooled and solidified with water, and then re-heated by heating rollers, to be followed by the step of forcing the sheet between a pair of metallic belts such that its appearance characteristics and its production rate may be improved. Though this process may provide a sheet with an increased transparency, it may substantially compromise its appearance characteristics, since stripe-like patterns may be formed laterally in the sheet when the action of the water's edge-like waves are imposed against the sheet while the fused resin is being cooled by water. The greater the sheet-withdrawal forces are, the more frequently such patterns may be formed.

On the other hand, while a non-crystalline thermoplastic sheet has been manufactured using a similar process, a sheet of improved gloss, and surface roughness may not be successfully provided. Thus, an improvement in this aspect has been desired.

DISCLOSE OBJECTS OF THE INVENTION

A primary object of the present invention is to provide a process and an apparatus therefore which may solve the above-described problems and permit the manufacture of crystalline thermoplastic sheet or film of superior appearance characteristics in transparency, gloss and surface flatness etc., at a high-speed, without requiring a special sheet thickness.

A second object of the present invention is to provide a process and an apparatus therefore which may permit the manufacture of non-crystalline thermoplastic sheets of superior gloss and surface flatness at a high-speed.

SUMMARY OF THE INVENTION

The process of the present invention for manufacturing the thermoplastic sheet includes the steps of introducing a fused thermoplastic resin which has been extruded in a sheet-like configuration from the T-die of a T-die extruder into a clearance between a cast drum and an endless belt which is spaced from and opposes against the surface of the drum in an arcuate configuration with a predetermined clearance formed therebetween, exposing the sheet-like fused resin to a primary cooling operation to be effectuated in the temperature range covering a point where the resin is thermally deformed and a point where it is softened, while forcing said sheet-like fused resin into a clearance between the cast drum and the endless metallic belt, then immediately introducing the sheet which has been subjected to this primary cooling operation into a cooling tank in which cooling water is held so that it may be cooled secondarily to its solidification temperature, removing water which has collected on the secondarily cooled sheet, and subsequently thermally treating the sheet from which remaining water has been removed at a temperature range between 40° C. lower than the thermally deforming point and 15° C. higher than the above-described reference point.

The the apparatus of the present invention for manufacturing the thermoplastic sheet includes a T-die of the T-die extruder in which the thermoplastic resin may be fused and the fused resin is extruded in a sheet-like configuration. Compressing and cooling means are arranged at the downstream side of the T-die, and are adapted to expose the sheet-like fused resin from the T-die to a primary cooling operation while compressing the resin in a clearance between a cast drum and an endless metallic belt in a predetermined spacing from and opposing relationship in an arcuate configuration with the drum surface. A cooling tank is arranged at the downstream side of the compressing and cooling means for secondarily cooling the sheet after its primary cooling step. Water removing means is arranged at the downstream side of the cooling tank for removing water off the sheet has been secondarily cooled, and thermally treating means which is arranged at the downstream side of the remaining water removing means for improving quality of the sheet from which water has been removed as above-described by applying heat. The metallic belt of the compressing and cooling means is pivotally supported in position by means of three first, second and third metallic rolls, and the first metallic roll is positioned above the cast roll in a place most adjacent to the T-die, such that an opposing space between the cast drum and the metallic drum may be formed in an arcuate configuration between the first metallic roll and the second metallic roll.

In the meantime, the sheet of the present invention as described herein includes the film.

Figure 1:
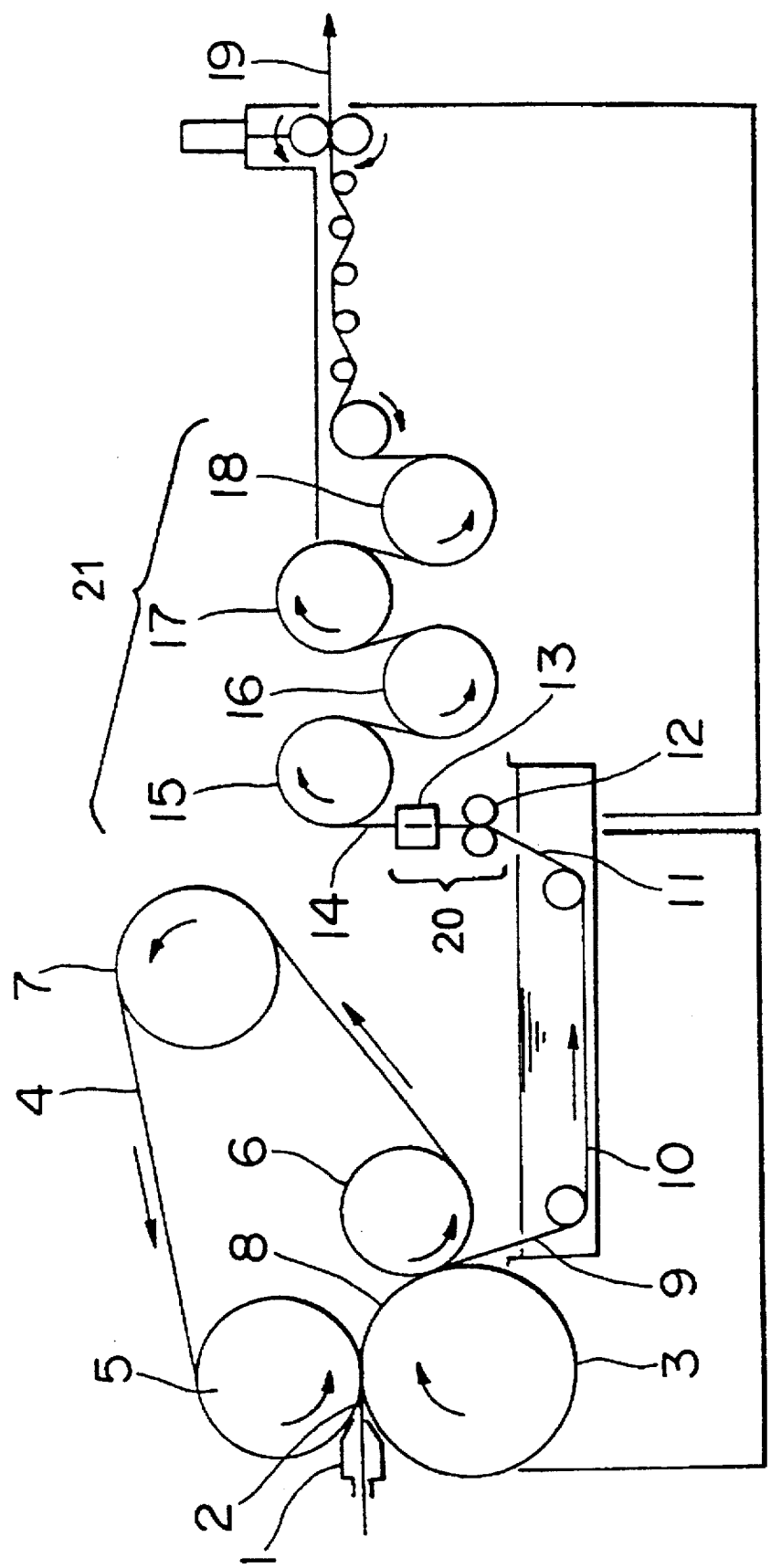
FIG. 1 is a schematic view illustrating one example of the apparatus for making the sheet built in accordance with the present invention.

The process and apparatus of the present invention will be described in detail hereinbelow.

In accordance with the present invention, it is possible to use a crystalline thermoplastic resin or a non-crystalline thermoplastic resin as a thermoplastic resin. As the crystalline resin, such materials may be used as polyethylene resin, polypropylene resin, crystalline polyester resin, and polyamide resin. A preferable material is polypropylene resin. As the non-crystalline resin, such materials may be suggested as polystyrene resin, acrylonitrile-butadiene-styrene resin (ABS resin), polycarbonate resin, non-crystalline polyethylene terephtalate resin (a-PET), vinylchloride resin and the like. These resins may be applied either as a mono-polymer, or a co-polymer in combination with other co-monomers, or alternatively its blend. In case the material used is, for example, polypropylene resin, it is also available to use a crystalline propylene monomer, a crystalline co-polymer to be formed by polymerizing propylene with a plurality of co-monomers such as, for example, ethylene, butene etc, other than propylene and its mixture.

It is also available to add, if desired, to the thermoplastic resin as above-described such materials as anti-oxidant, lubricant, antistatic agent, slip agent, antiblocking agent, ultraviolet absorber, nucleus forming agent, transparency improver, organic peroxide, inorganic filler material such as pigment, talc, and calcium carbonate, organic filler material such as wood flour, synthetic fiber etc., and other resin or rubber (in the case of polypropylene resin, for example, polyethylene, polypropylene rubber and the like can be added).

Then, the process of the present invention will be described hereinbelow, with reference to an apparatus illustrated in the drawing.

In FIG. 1, there are shown a T-die 1 in the T-die extruder, and a thermoplastic resin which has been fused in the extruder (the main frame of which is not illustrated) and then extruded from the T-die 1 in a sheet-like configuration. Arranged at the downstream side of the T-die 1 is compressing and cooling means consisting of the cast drum 3 and the endless belt 4 which opposes against the surface of the drum in a predetermined clearance therebetween in an arcuate configuration. The metallic belt 4 is pivotally supported in position by means of first, second and third metallic rolls 5, 6 and 7. These metallic rolls are positioned in a place most adjacent to the T-die 1, thereby forming the opposing region of arcuate configuration, or the compressing and cooling portion 8 of the cast drum 3 and endless metallic belt 4 between this metallic roll 5 and the second metallic roll 6.

The sheet-like fused resin 2 which has been extruded through the T-die 1 is then introduced into a clearance between the cast drum 3 and the endless belt 4, that is, the compressing and cooling section 8, and then transferred toward the second metallic roll 6, and thus the sheet-like fused resin 2 is exposed to the primary cooling operation while it is being compressed at the compressing and cooling section 8. In the meantime, it may be difficult and unnecessary to maintain a uniform clearance between the cast drum 3 and the metallic endless belt 4 along the entire span from the first metallic roll 5 to the second metallic roll 6 before the fused resin is introduced, since the metallic belt 4 is flexible. Thus, it is only required that the belt portions against which the first metallic roll 5 and the second metallic roll 6 may at least contact respectively are preset at a predetermined value prior to introduction of the fused resin. In other words, the above-described clearance dimensions may be maintained to be uniform between the contact points (the metallic belt between the first metallic roll 5 and the second metallic roll 6) under a compressive stress to be imposed by the fused resin.

The clearance between the cast drum 3 and the endless belt 4 is designed to be adjustable by a mechanical adjustment in such a way that for example, the cast drum 3 may be shifted upwardly or downwardly. These clearance dimensions correspond to a thickness to which the sheet 19 may desirably be produced as a product. Consequently, the product sheet thickness may be eventually determined by presetting these clearance dimensions.

The primary cooling temperature to be achieved during the compressing and cooling operation represents a temperature range covering a point where the thermoplastic resins are thermally deformed and a softening point (that is, normally in the range of 90°–160° C. with polypropylene, for example ). (This testing procedure is in accordance with JIS K-6758, with the assumption that a load is 1 kgf.) When the primary cooling temperature is lower than the above-described level at which a thermal deformation may occur, the sheet with superior transparency and gloss may not be obtained. On the other hand, if the primary cooling temperature exceeds the above-described softening point, the sheet will become too soft to impair its characteristics of releasing from the cast drum 3 and the metallic belt 4, resulting in a multiple of minute defects on the sheet surface, or wrinkles may be produced on the sheet in a subsequent step of transferring the sheet into the cooling tank 10, and thereby interfering with the production of good quality products.

In the present invention, it is preferable to construct first and third metallic rolls 5, 7 such that they may be heated from their internal section, and the metallic belt 4 may be heated by these first and third metallic rolls 5, 7 which have been thus heated from their internal sections. The heating temperature of this metallic belt with the polypropylene resin usually has its surface temperature in the range of 50°–150° C., for example. It is also preferable to construct the cast drum 3 to be heated from their internal sections in a similar manner. The heating temperature of the cast drum with the polypropylene resin usually has its surface temperature in the range of 50°–150° C., for example.

Each of the metallic belts 4 is formed of SUS (stainless steel), carbon steel, titanium alloy and the like, but a material SUS is preferred by virtue of its greater corrosion inhibitive property etc. The cast drum and metallic rolls 5, 6 and 7 may be formed of carbon steel (with hard chrome plating applied over its surface), as in the case of prior art.

It is suitable to select the surface hardness of the cast drum 3 and the metallic belt 4 (at a surface where it may contact with the above-described fused resin) to be less than 0.5 μm, and more preferably to be less than 0.3 μm, when it is used to make a sheet with improved appearance characteristics (that is, one having an improved transparency and appearance characteristics when a crystalline thermoplastic resin is used, and one having an improved gloss and surface smoothness when a non-crystalline thermoplastic resin is used). Meanwhile, such cast drum 3 or metallic belt 4 can provide the sheet-like fused resin with an improved transferability.

The cast drum 3 is not limited to the above-described surface roughness when it is used to provide a product sheet upon which an emboss pattern or a strip-like straight pattern is used, for example, and any suitable pattern may be provided suitably on the surface by applying a sculpturing process and the like.

Since the metallic belt 4 is used as an endless belt to be jointed by a welding process, it is required that irregular configurations on the welded portion may not impose any influence upon the sheet. In the case of a reduced thickness metallic belt, such irregular configurations may occur easily at the joint portion, whereas a greater thickness metallic belt may loose its flexibility and interfere with its intended application. Thus, the metallic belt is suitably formed to have its thickness in the range of 0.5–1.2 mm.

The first metallic roller 5 may preferably have a heat-resistant rubber such as a silicon rubber, or a resilient elastomer coated over its surface when it is desired to provide a sheet having optically improved characteristics without impairing its surface smoothness characteristics. When an elastomer is used, the rubber hardness is suitably in the range of 55–85. In either case, the coating thickness is suitably in the range of 5–15 mm.

The sheet 9 which has been exposed to the primary cooling operation as above-described is then immediately brought into a cooling tank 10 which contains a cooling water and is arranged at the downstream side of the compressing and cooling means. Consequently, the sheet is exposed to a second cooling operation where it is cooled to be solidified completely. The temperature of cooling water is suitably in the range of 0°–25° C. when a polypropylene sheet is treated, for example.

Then, the sheet 11 which has been exposed to a second cooling operation is guided to means 20 which is arranged at the downstream side of the cooling tank 10 for removing water, and cooling water which has collected on the sheet 11 during the secondary cooling operation is removed. The remaining water removing means may be formed in a straightforward construction which includes, for example, a pair of pinch rolls 12, and an air blow device 13 which is arranged downstream of the pinch rolls. In this case, remaining water on the sheet 11 is squeezed out through a pair of pinch rolls 12, and may be completely removed by an air spraying from the airblow device 13 (the air may be cold or heated).

It is often experienced that the rigidity of the sheet 14 is reduced due to a curling, or the resins are not crystallized adequately. Therefore, the present invention attempts to improve these characteristics through thermal treatment. Thus, in the process of the present invention, the sheet 14 which has its remaining water removed is finally guided to thermal treating means 21 which is arranged at the downstream side of the remaining water removing means 20, and is exposed to the thermal treatment so that the product sheet 19 may be provided which has desired performance characteristics.

The thermal treatment means 21 may be formed in a straightforward construction in which it includes, for example, a plural number (in this case, four, for example) of heated metallic rollers 15, 16, 17 and 18 (each of which is constructed to be heated internally by means of heating oil etc.) or an oven.

The heating temperature covers a range of 40° C. lower than the thermal deformation point of the thermoplastic resin (more preferably a point of 30° lower than the above-described thermal treating level) and a point 15° C. higher than the thermally deformable level (more preferably 5° C. higher than the above-described thermally deforming temperature). (This temperature range normally covers 90°–150° C. when polypropylene is treated.) A substantial effect in modifying curled configuration and improving rigidity may not be expected if it is lower than 40° C. lower than the thermal deformation level. Wrinkles and impaired appearances such as transparency and gloss may occur at a temperature 15° C. higher than the thermal deformation point, because the sheet acquires a soft condition.

BEST MODE FOR CARRYING OUT THE INVENTION

[Embodiment 1]

The polypropylene sheet was manufactured using the apparatus as shown in FIG. 1.

The polypropylene resin used was a nitrogen polymer XF 1893 (a product name of polypropylene monomer available from Tisso Co., Ltd) with density 0.90 g/m$^3$, melt-flow rate 1.8 g/10 minutes, thermal deformation temperature 90° C., and softening temperature of 130° C. This resin was melted in the T-die extruder (the extruder cylinder diameter 100 mm, L/D=36, the die width 550 mm, and the die lip clearance 1.2 mm) (components other than the T-die not shown), and was extruded through the T-die 1 in a sheet-like configuration. This sheet-like fused resin was then introduced into a clearance between the cast drum 3 and the endless metallic belt 4, and was exposed to a primary cooling operation while it was being compressed, and it was then immediately guided to the cooling tank to effectuate a secondary cooling operation. After remaining water was subsequently removed through the pinch-roll 11 and the air-blow device 13, the polypropylene sheet of 0.3 mm thickness was made by applying a thermal treatment procedure to heat metallic rolls 15, 16, 17 and 18.

The particulars and sheet manufacturing conditions were as described below;

Metallic Belt: SUS

Cast Drum

Carbon Steel with Hard Chrome Plated Surface, Width: 650 mm, Surface Roughness: 0.3 μm, Surface Temperature: 90° C.

First Metallic Roll

Silicon Rubber of 65 Rubber Hardness Coated Over the Surface in Thickness 10 mm.

Arcuate Compressing and Cooling Section

Length: 60 cm.

Clearance between Cast Drum and Metallic Belt: 0.3 mm

Sheet Withdrawal Speed 10 m/min (Rotating speed of the cast drum and the travelling speed of the metallic belt were both 10 m/min.)

Primary Sheet Cooling Temperature 110° C.

Water Tank

Length: 4 m,

Cooling Water Temperature: 10° C.

Air-Blow Device

Blow Air Temperature: 80° C.

Thermally Treatment Means (Heating Metallic Roll Group)

Material: Carbon Steel with Hard Chrome-plated Surface

Upstreammost Roll 15 Temperature: 60° C.

Downstreammost Roll 18 Temperature: 50° C.

Intermediate Rolls 16, 17 Temperature Between Above-described Rolls: 100° C.

Surface Roughness of these Metallic Rolls: 1.0 μm

The polypropylene sheet which was made as above-described had haze (transparency) 3.4%, gloss 114% and superior surface smoothness with no streaks, wrinkles and water's edge-like waves etc., and so it had superior optical characteristics and appearance, with a high Young's Module (Rigidity) of 94.

Meanwhile, the methods for measuring the thermally deforming temperature and the softening temperature were as described below.

Thermally Deforming Temperature: JIS K-7207 (Load 4.6 kgf/c)

Softening Temperature: JIS K-6758 (Vicar Softening Point, Load 1.0 kgf)

Melt Flow Rate: JIS K-6758 (230° C., Load 2.16 kgf)

Density: JIS K-6758

Haze: ASTM D-1003

Gloss: ASTM D-523

Young's Module: ASTM D-882

Surface Smoothness: Visual Inspection

Streaks, Wrinkles, Water's Edges: Visual Inspection

[Embodiment 2]

A polypropylene sheet of 0.5 mm in thickness was made using the same process as that of the Embodiment 1, except that the clearance between the cast drum and the metallic belt was selected to be 0.5 mm.

This sheet had superior characteristics substantially comparable to those in the Embodiment 1. That is, the sheet had a superior surface smoothness, i.e., haze (transparency) 4.0% and a gloss 124%. Besides, since no streaks, wrinkles and water's edge-like surface etc., take place, optical characteristics and appearance were improved, providing a high Young's Module (rigidity) of 90.

[Embodiment 3]

A polypropylene sheet of 1.0 mm thickness was produced in accordance with the same manufacturing process as that employed in Embodiment 1, except that a clearance between the cast drum and the metallic belt was preset to be 1.0 mm.

This sheet also showed improved characteristics substantially the same with those in the Embodiment 1, that is, the sheet was superior in its surface smoothness, showing a haze (transparency) 9.5% and a gloss 127%. Since no streaks, wrinkles and water's edge-like wavy surface etc., take place, it had improved optical characteristics and appearances. It showed a high Young's Module (Rigidity) of 88.

[Embodiment 4]

A polypropylene sheet of 0.3 mm thickness was produced in accordance with the same procedure as that used in the Embodiment 1, except that the cast drum, the first metallic drum and the thermal treating means were modified as below.

Cast Drum: Emboss Pattern Formed On the Surface

First Metallic Roll: No Surface Coating Layer

Thermal Treatment Means (Metallic Rolls Group)

Intermediate Rolls 16, 17 Surface Temperature: 80° C.

The embossed sheet displayed superior optical characteristics of haze 3.6%, gloss 121% and the Young's Module 85.

[Comparison I]

A polypropylene sheet of 0.3 mm thickness was produced using the same manufacturing process as that used in a Embodiment 1, except that the metallic rolls in a thermal treating means, i.e., downstreammost and upstreammost metallic rolls were made to have equal surface temperatures, and the intermediate metallic roll had the surface temperature of 130° C. The sheet had the haze of 11.5%, gloss 86% and the Young's Module 90. The sheet was verified to be inferior to one as obtained in respective embodiments, showing a poor surface smoothness and wrinkles on the sheet surface.

Possibility for Industrial Utilization

In accordance with the present invention, a thermoplastic sheet or film may be provided which has superior optical characteristics such as transparency and gloss etc, appearance characteristics such as surface smoothness etc, and rigidity and the like, when a crystalline thermoplastic resin is used. On the other hand, when a non-crystalline thermoplastic resin is used, a thermoplastic sheet or film may be provided which has superior optical characteristics such as gloss etc, appearance characteristics such as surface smoothness etc, and rigidity and the like. Either of these sheets or films may be embossed as desired. Furthermore, it is also possible to make a high quality product with a reduced or increased thickness sheet or film. Additionally, the production speed can be made several times faster than that available in the prior process. The process and the device of the present invention may be also applied in the production of multi-layered sheet or laminated sheet.

Consequently, the sheet or the film which may be obtained using the present invention may be usably utilized in packaging foodstuff, drugs, packaging case for cosmetics and household articles and industrial raw materials.

I claim:

1. A process for manufacturing a thermoplastic sheet, wherein said process comprises the steps of:

introducing a fused thermoplastic resin which has been extruded from a T-die in a T-die extruder in a sheet-like configuration into a clearance between an outer surface of a cast dram and a metallic endless belt which opposes said drum surface with a predetermined spacing therebetween in an arcuate configuration;

cooling the fused resin of sheet-like configuration in a primary cooling operation in a temperature range covering a thermal deformation point of said resin and a softening point of said resin, while compressing said sheet-like fused resin between the cast drum surface and the endless belt;

introducing the sheet which has been subject to a primary cooling immediately into a cooling tank having cooling water so as to secondarily cool the resin to at least its solidifying temperature;

removing cooling water which has collected on the secondarily cooled sheet; and thermally treating said secondarily cooled sheet in a temperature range between a point about 40° C. lower than the thermal deformation temperature and a point about 15° C. higher than the thermal deformation point.

2. The process as claimed in claim 1, wherein the thermoplastic resin is a polypropylene resin.

3. The process as claimed in claim 2, wherein the primary cooling temperature is in the range 90°–100° C., and the thermally treating temperature is in the range 90°–150°.

4. The process as claimed in claim 2, wherein the secondary cooling temperature is in the range 0°–25° C.

5. The process as claimed in claim 2, wherein the primary cooling temperature is achieved by maintaining the temperature of a first metallic roller, about which said belt rotates and which is adjacent to said cast drum and said T-die, at a temperature in the range of 50°–150° C., and by maintaining the temperature of the cast drum surface at a temperature in the range of 50°–150° C.

6. An apparatus for manufacturing a thermoplastic resin comprising a T-die in a T-die extruder to fuse a thermoplastic resin and extrude the fused resin into a sheet-like configuration;

compressing and primary cooling means which is arranged at the downstream side of the T-die for cooling said sheet-like fused resin from the T-die in a primary cooling operation while compressing said sheet-like fused resin between a surface of a cast drum and a metallic endless belt which opposes the drum surface with a predetermined clearance therebetween in an arcuate configuration;

a cooling tank downstream of the compressing and primary cooling means for immediately secondarily cooling the resin sheet which has been subject to the primary cooling, said tank containing cooling water;

means downstream of said cooling tank for removing cooling water from the secondarily cooled sheet, and thermal treating means downstream of said water removing means for heating the sheet from which the collected water has been removed so as to improve the performance characteristics of the resin, wherein said metallic belt is pivotally supported in position by first, second and third rollers, and said first roller lies above the cast dram and adjacent to the T-die and said second metallic roller lies a distance from said first metallic roller and adjacent to said cast drum so as to enable said belt to form a spacing in an arcuate configuration.

7. The apparatus as claimed in claim 6, wherein said metallic belt is formed of a material selected from the group consisting of SUS, carbon steel and titanium alloy.

8. The apparatus as claimed in claim 6, wherein the first metallic roller has its surface coated with a material selected from the group consisting of a heat-resistant rubber and a resilient elastomer.

9. The apparatus as claimed in claim 6, wherein the cast drum, the first metallic roller and the third metallic roller are heated by an internal heating means.

10. The apparatus as claimed in claim 6, wherein the cast drum and the metallic belt have the surface roughness of less than 0.5 mm.

11. The apparatus as claimed in claim 6, wherein the cast drum surface is embossed.

12. The apparatus as claimed in claim 6, wherein the metallic belt has the thickness in the range of 0.5–1.2 mm.

13. The apparatus as claimed in claim 6, wherein said water removing means consists of a pair of pinch rolls and an air blow device which is downstream of the pinch rolls.

14. The apparatus as claimed in claim 6, wherein said thermal treating means consists of a plurality of heated metallic rollers.

15. The apparatus as claimed in claim 6, wherein said thermal treating means includes a plurality of metallic rollers in a heating oven.

* * * * *

UNITED STATES PATENT AND TRADEMARK OFFICE
CERTIFICATE OF CORRECTION

PATENT NO. : 5,674,442
DATED : October 7, 1997
INVENTOR(S) : Keita Morita

It is certified that error appears in the above-identified patent and that said Letters Patent is hereby corrected as shown below:

Column 2, line 15, delete "Disclose"

Column 8, line 49, delete "dram" and insert

--drum-- therefor

Column 9, line 24, delete "dram" and insert

--drum-- therefor

Signed and Sealed this

Eighth Day of September, 1998

Attest:

BRUCE LEHMAN

*Attesting Officer*      *Commissioner of Patents and Trademarks*